(12) United States Patent
Taha

(10) Patent No.: US 12,262,658 B2
(45) Date of Patent: Apr. 1, 2025

(54) TECHNICIAN PERFORMANCE SYSTEM

(71) Applicant: Ayman Taha, Nashville, TN (US)

(72) Inventor: Ayman Taha, Nashville, TN (US)

(73) Assignee: LOUISIANA-PACIFIC CORP., Nashville, TN (US)

( * ) Notice: Subject to any disclaimer, the term of this patent is extended or adjusted under 35 U.S.C. 154(b) by 0 days.

(21) Appl. No.: 17/579,409

(22) Filed: Jan. 19, 2022

(65) Prior Publication Data

US 2022/0225563 A1    Jul. 21, 2022

Related U.S. Application Data

(60) Provisional application No. 63/138,823, filed on Jan. 19, 2021.

(51) Int. Cl.
| | |
|---|---|
| *A01C 23/00* | (2006.01) |
| *A01C 17/00* | (2006.01) |
| *A01G 25/16* | (2006.01) |
| *G01D 9/00* | (2006.01) |
| *G01D 11/24* | (2006.01) |
| *G01P 15/08* | (2006.01) |
| *G01P 15/14* | (2013.01) |

(52) U.S. Cl.
CPC .......... *A01C 23/007* (2013.01); *A01C 17/006* (2013.01); *A01G 25/16* (2013.01); *G01D 9/005* (2013.01); *G01D 11/245* (2013.01); *G01P 15/0802* (2013.01); *G01P 15/14* (2013.01)

(58) Field of Classification Search
CPC .... A01C 23/007; A01C 17/006; A01G 25/16; G01D 9/005; G01D 11/245; G01D 21/02; G01P 15/0802; G01P 15/14; A01B 76/00
See application file for complete search history.

(56) References Cited

U.S. PATENT DOCUMENTS

| | | | |
|---|---|---|---|
| 5,644,551 A * | 7/1997 | Carmichael | G07C 7/00 368/6 |
| 5,927,603 A * | 7/1999 | McNabb | A01G 25/167 239/69 |
| 7,417,731 B1 | 8/2008 | Masten | |
| 9,655,356 B1 | 5/2017 | Lytle, Jr. | |
| 2004/0034459 A1 | 2/2004 | Hoelscher et al. | |

(Continued)

OTHER PUBLICATIONS

International Search Report and Written Opinion, PCT/US22/012991, Taha, Ayman (international filing date Jan. 19, 2022).

*Primary Examiner* — Chad G Erdman
(74) *Attorney, Agent, or Firm* — Wayne Edward Ramage; Baker Donelson

(57) ABSTRACT

A system and methods for monitoring and evaluating the performance of a lawn-care technician. A Technician Performance Module (TPM) is affixed to or embedded in a device or apparatus used by the technician, such as a sprayer or a spreader. The TPM comprises a plurality of sensors (e.g., GPS, gyroscope, accelerometer, compass, pedometer) which collect, store, and/or transmit an assortment of data as described below. The data may be transmitted wirelessly to a control box, which may be located in a nearby vehicle, such as a truck used by the technician at the site of the lawn-care services being provided. The data also may be transmitted wireless to a cellular or wireless gateway for transmission to system servers for storage and analysis.

17 Claims, 9 Drawing Sheets

(56) References Cited

U.S. PATENT DOCUMENTS

| | | |
|---|---|---|
| 2011/0231217 A1 | 9/2011 | Hand |
| 2015/0007541 A1 | 1/2015 | Albinger et al. |
| 2015/0245565 A1 | 9/2015 | Pilgrim et al. |
| 2017/0031365 A1 | 2/2017 | Sugumaran et al. |
| 2017/0039425 A1 | 2/2017 | Itzhaky et al. |
| 2017/0249417 A1* | 8/2017 | Gosieski, Jr. .......... B33Y 50/02 |
| 2017/0349058 A1* | 12/2017 | Bernier ............. H02J 13/00004 |
| 2018/0085763 A1* | 3/2018 | Leckner ................... B05B 1/16 |
| 2019/0008103 A1* | 1/2019 | Goldberg ............. G05D 1/0246 |
| 2019/0230850 A1* | 8/2019 | Johnson ............... A01D 75/006 |
| 2019/0291779 A1 | 9/2019 | Zeiler et al. |
| 2021/0364632 A1* | 11/2021 | Sagalovich .......... G05D 1/0278 |
| 2022/0342426 A1* | 10/2022 | He ....................... A01D 34/008 |

\* cited by examiner

TECHNICIAN PERFORMANCE SYSTEM

This application claims benefit of and priority to U.S. Pat. App. No. 63/138,823, filed Jan. 19, 2021, which is incorporated herein in its entirety by specific reference for all purposes.

FIELD OF INVENTION

This invention relates to a system and methods for monitoring and evaluating the performance of a technician. More particularly, this invention relates to a system and methods for monitoring and evaluating the performance of a lawn-care technician.

SUMMARY OF INVENTION

In various exemplary embodiments, the present invention comprises a system and methods for monitoring and evaluating the performance of a lawn-care technician. A Technician Performance Module (TPM) is affixed to or embedded in a device or apparatus used by the technician, such as a sprayer or a spreader. The TPM comprises a plurality of sensors (e.g., GPS, gyroscope, accelerometer, compass, pedometer) which collect, store, and/or transmit an assortment of data as described below. The data may be transmitted wirelessly to a remote server or control box, which may be located in a nearby vehicle, such as a truck used by the technician at the site of the lawn-care services being provided. The data also may be transmitted wireless to a cellular or wireless gateway for transmission to system servers for storage and analysis.

The system thus tracks, stores, and provides useful metrics and Key Performance Indicators (KPIs), regarding the use of the sprayer, spreader, or other devices used to treat lawns and landscape with dry and/or liquid products. These metrics include, but are not limited to, the application path and size, and spray patterns. The data is collected, stored, and subsequently used for evaluation or quality assurance purposes, among other reasons.

The TPM comprises a sensor fusion-based device that is attached to the treatment device, or in some embodiments, in line with it (e.g., on the hose, or between the hose and the sprayer). Sensor fusion is the process or method of merging data from multiple sensors to create a more accurate picture or conceptualization of a target object or item or activity. The TPM may be removably affixed to the bottom of a sprayer. Alternatively, the TPM may be affixed to or embedded in other parts of the sprayer, such as, but not limited to, the handle or top. The TPM may be retrofitted to a prior art sprayer in under ten minutes. The sprayer requires no special operational procedures once retrofitted.

In several embodiments, the TPM comprises an IMU (inertial measurement unit) module, along with other sensors. The IMU module may comprise a compass, one or more gyroscopes, and one or more accelerometers). TPM may comprise a wireless communications chip for wireless communications, but also may include one or more telecommunications ports, such as a USB or similar port. The TPM thus may track sprayer trigger position and angles, as well as estimate the approximate motion-path of the sprayer while it is in use. The TPM may be retrofitted/integrated into existing sprayers and spreaders (and other devices).

The TPM comprises an embedded Global Positioning System (GPS) chip along with customized embedded firmware use to detect and report the heading (bearing), orientation (direction), and position of the TPM as well as the sprayer trigger position. The TPM on a sprayer may be powered by an internal rechargeable or replaceable battery, along with battery management circuitry. Wireless transmissions may be continuous or periodic to help extend battery life. In one embodiment, the TPM communicates with a wireless Digital-Spread-Spectrum (DSSS) communication device at a rate of 2 Hz.

In several embodiments, the TPM uses customized firmware comprising motion-path estimation algorithms that work independently of GPS data, thereby allow a single TPM capable of accurately reporting both the spray pattern and motion-path. The firmware further receives longitude and latitude data from the GPS module, and adds this to the data stream as longitude/latitude coordinates and/or x/y meter offset values. The system further comprises an algorithm for determining sweep-range and heading estimates that work independently from GPS position estimates. A "soft-switch" power switch design allows the TPM unit to remain on for a programmable amount of time after power has been removed or shut down.

A TPM similarly may be removably affixed to the handlebar assembly of a spreader device with wheels. Alternatively, the TPM may be affixed or embedded in other parts of the spreader. In the embodiment shown, a power switch (PWRSW) for the TPM is mounted remotely or away from the TPM location. This helps prevent a magnetic ON/OFF switch from adversely affecting the TPM's magnetic compass. Wiring between the TPM and PWRSW may be routed along or within the handlebars (i.e., the handlebar components are hollow, and holes drilled into the components to insert the wires/cables). In an alternative embodiment, the power switch is incorporated with all other electronics in a single enclosure, which reduces drilling, wiring, and installation costs, as well as reducing the number and cost of enclosures. Magnetic shielding is used to help prevent the magnetic ON/OFF switch from adversely affecting the magnetic compass. The TPM may be retrofitted to a prior art spreader in 10 to 45 minutes, depending on the location of the power switch with respect to the TPM and the amount of retrofitting required.

A control box is the central controller and orchestrator of the system, and is in wireless communications with the various TPMs in use on the sprayers, spreaders, or other devices, and may also be in electronic communication with one or more remote system servers. The control box may be mounted in a truck or other vehicle used by the technician on service calls. An LTE/GPS antenna, mounted on the truck, typically on an outside upper surface, such as the roof, is in electronic communication with the control box. In one embodiment, the antenna is mounted using industrial double-side tape. The system may be powered by its own battery. Alternatively, it may be powered by another power source, such as the batter of the truck. The control box is electronically connected to one or more charging ports for the TPMs, sprayers, spreaders, or other devices at various points inside the truck.

In the embodiments shown, four holes are used to mount the control box inside the truck, using carriage bolts sufficient short so as to not create safety issues with regard the mounting location (such as bolts protruding into a spreader cabinet). The box comprises a hinged lid, which allows access to the interior. A cable is used to connect the control box to the LTE/GPS antenna. Positive and negative battery cables with associated lugs, with corresponding color code, are used to connect to the truck battery (or similar power source). Screw-mounted cable tie downs may be used to secure any of the cables in the system. The system as shown may be retrofitted to an existing truck in 70 minutes or less.

DETAILED DESCRIPTION OF EXEMPLARY EMBODIMENTS

Figure 1:
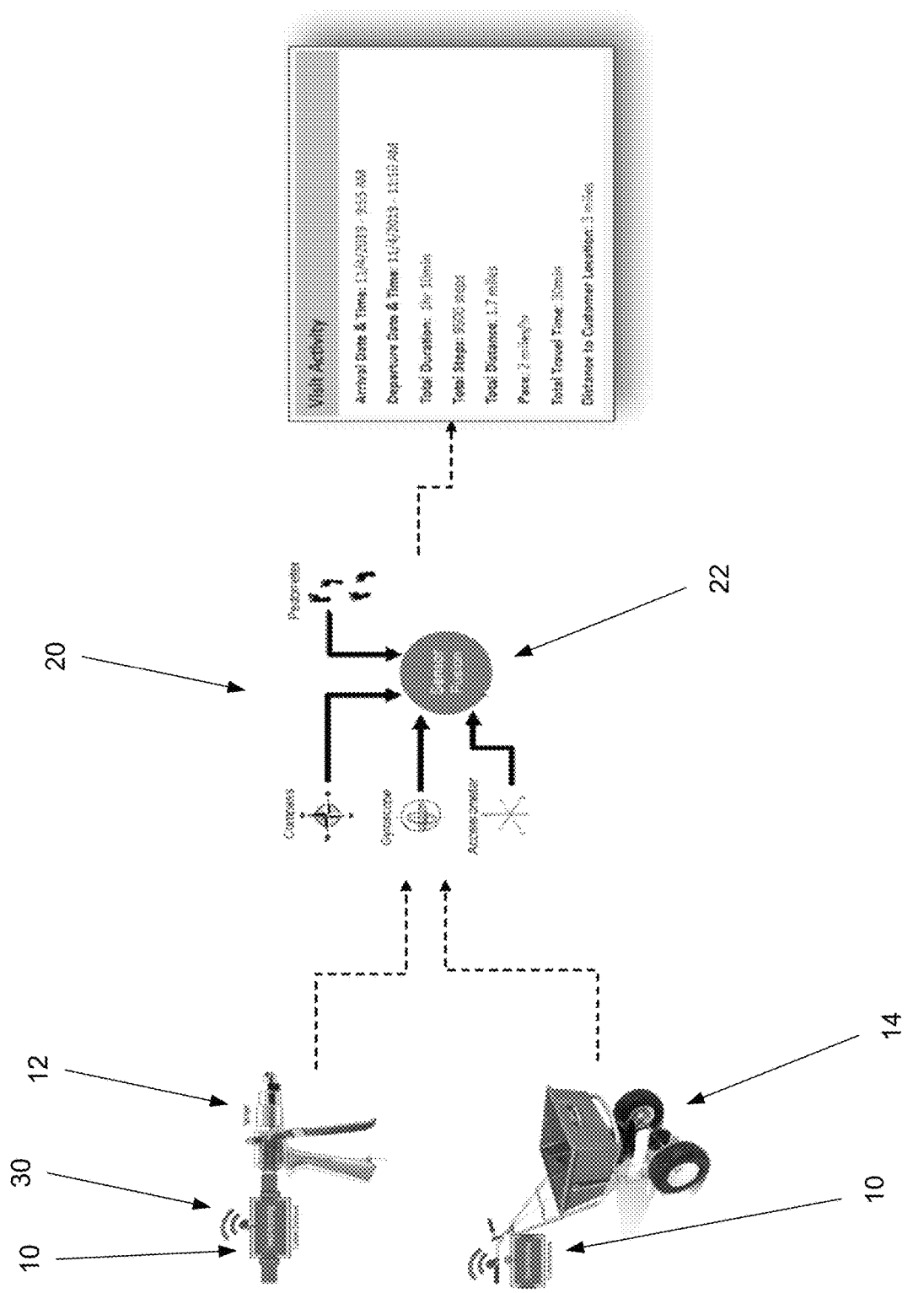
FIG. 1 shows a diagram of a system in accordance with an exemplary embodiment of the present invention.

In various exemplary embodiments, the present invention comprises a system and methods for monitoring and evaluating the performance of a lawn-care technician. As seen in FIG. 1, a Technician Performance Module (TPM) 10 is affixed to or embedded in a device or apparatus used by the technician, such as a sprayer 12 or a spreader 14. The TPM 10 comprises a plurality of sensors 20 (e.g., GPS, gyroscope, accelerometer, compass, pedometer) which collect, store, and/or transmit an assortment of data as described below. The data may be transmitted wirelessly 30 to a control box 50, which may be located in a nearby vehicle 60, such as a truck used by the technician at the site of the lawn-care services being provided. The data also may be transmitted wireless to a cellular or wireless gateway 90 for transmission to system servers for storage and analysis.

The system thus tracks and stores data input from the plurality of sensors and other sources, and provides useful metrics and Key Performance Indicators (KPIs), regarding the use of the sprayer 12, spreader 14, or other devices used to treat lawns and landscape with dry and/or liquid products. These metrics include, but are not limited to, the application path and size, and spray patterns. The data is collected, stored, and subsequently used for evaluation or quality assurance purposes, among other purposes.

Figure 2:
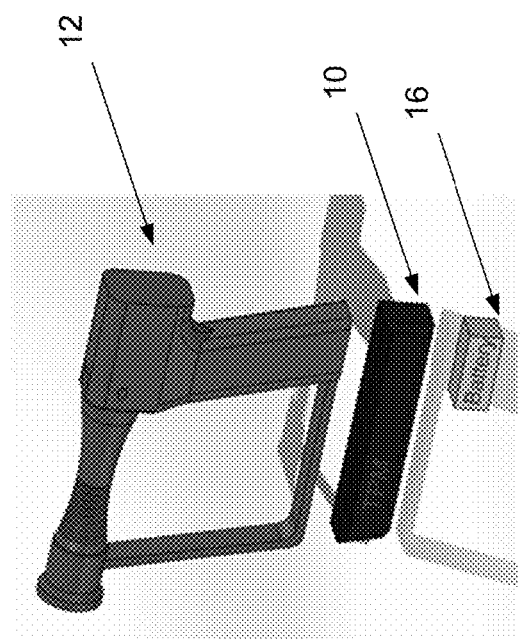
FIG. 2 shows a view of a sprayer with a Technician Performance Module (TPM).
Figure 2:
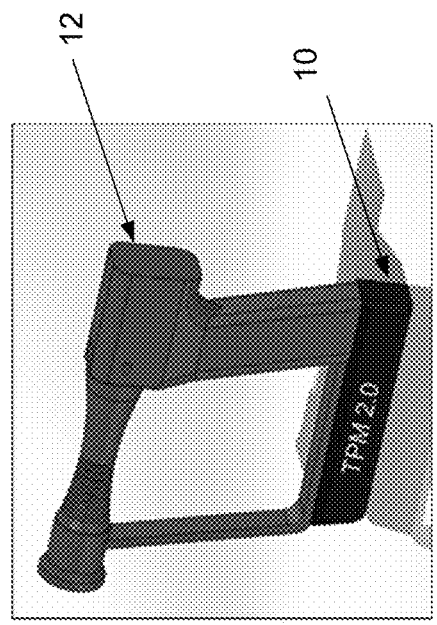

The TPM 10 comprises a sensor fusion-based device that is attached to the treatment device, or in some embodiments, in line with it (e.g., on the hose, or between the hose and the sprayer). Sensor fusion 22 is the process or method of merging data from multiple sensors to create a more accurate picture or conceptualization of a target object or item or activity. FIG. 2 shows an exemplary embodiment of the TPM 10 that is removably affixed to the bottom of a sprayer 12. Alternatively, the TPM may be affixed to or embedded in other parts of the sprayer, such as, but not limited to, the handle or top. The TPM 10 may be retrofitted to a prior art sprayer 14 in under ten minutes. In the embodiment show, the sprayer requires no special operational procedures once retrofitted.

In several embodiments, the TPM comprises an IMU (inertial measurement unit) module, along with other sensors. The IMU module may comprise a compass, one or more gyroscopes, and one or more accelerometers). TPM may comprise a wireless communications chip for wireless communications, but also may include one or more telecommunications ports, such as a USB or similar port. The TPM thus may track sprayer trigger position and angles, as well as estimate the approximate motion-path of the sprayer while it is in use. The TPM may be retrofitted/integrated into existing sprayers and spreaders (and other devices).

In the embodiment shown, the TPM comprises an embedded Global Positioning System (GPS) chip along with customized embedded firmware use to detect and report the heading (bearing), orientation (direction), and position of the TPM as well as the sprayer trigger position (e.g., off, or on with a single or various amounts of flowrate). The TPM on a sprayer may be powered by an internal rechargeable or replaceable battery 16, along with battery management circuitry in the TPM. Wireless transmissions 30 may be continuous or periodic to help extend battery life. In one embodiment, the TPM communicates with a wireless Digital-Spread-Spectrum (DSSS) communication device at a rate of 2 Hz.

In several embodiments, the TPM 10 uses customized firmware comprising motion-path estimation algorithms that work independently of GPS data, thereby allowing a single TPM to be capable of accurately reporting both the spray pattern of the sprayer and motion-path of the sensor. The firmware further receives longitude and latitude data from the GPS module, and adds this to the data stream as longitude/latitude coordinates and/or x/y meter offset values. The system further comprises an algorithm for determining sweep-range and heading estimates that work independently from GPS position estimates. A "soft-switch" power switch design allows the TPM unit to remain on for a programmable amount of time after power has been removed or shut down.

Figure 3:
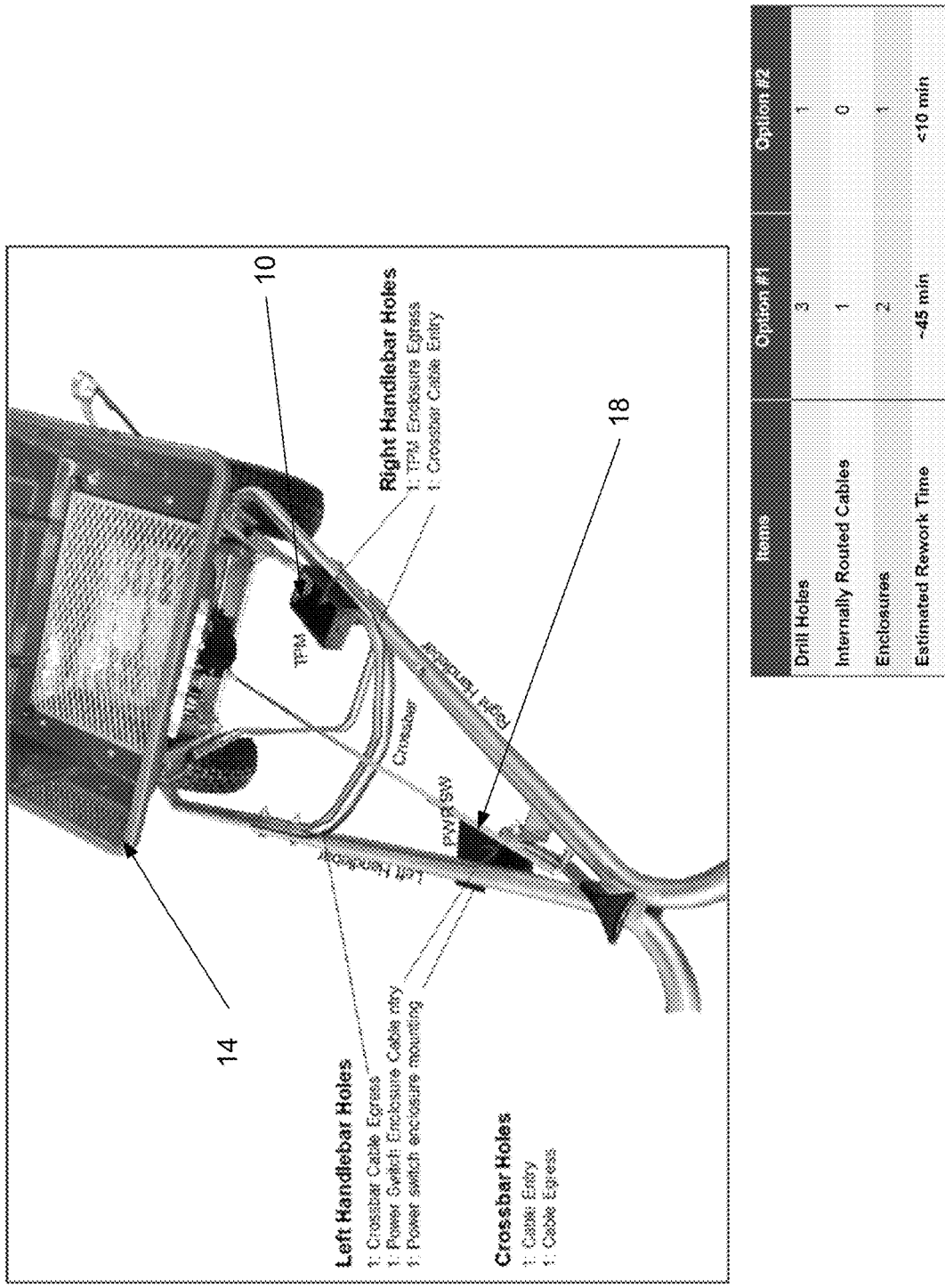
FIG. 3 shows a view of a spreader with a TPM.

FIG. 3 shows an exemplary embodiment of a TPM 10 removably affixed to the handlebar assembly of a spreader 14 device with wheels. Alternatively, the TPM may be affixed or embedded in other parts of the spreader. In the embodiment shown, a power switch (PWRSW) 18 for the TPM 10 is mounted remotely or away from the TPM location. This helps prevent a magnetic ON/OFF switch from adversely affecting the TPM's magnetic compass. Wiring between the TPM and PWRSW may be routed along or within the handlebars (i.e., the handlebar components are hollow, and holes drilled into the components to insert the wires/cables). In an alternative embodiment, the power switch is incorporated with all other electronics in a single enclosure, which reduces drilling, wiring, and installation costs, as well as reducing the number and cost of enclosures. Magnetic shielding is used to help prevent the magnetic ON/OFF switch from adversely affecting the magnetic compass. The TPM 10 may be retrofitted to a prior art spreader 14 in 10 to 45 minutes, depending on the location of the power switch with respect to the TPM and the amount of retrofitting required.

Figure 4:
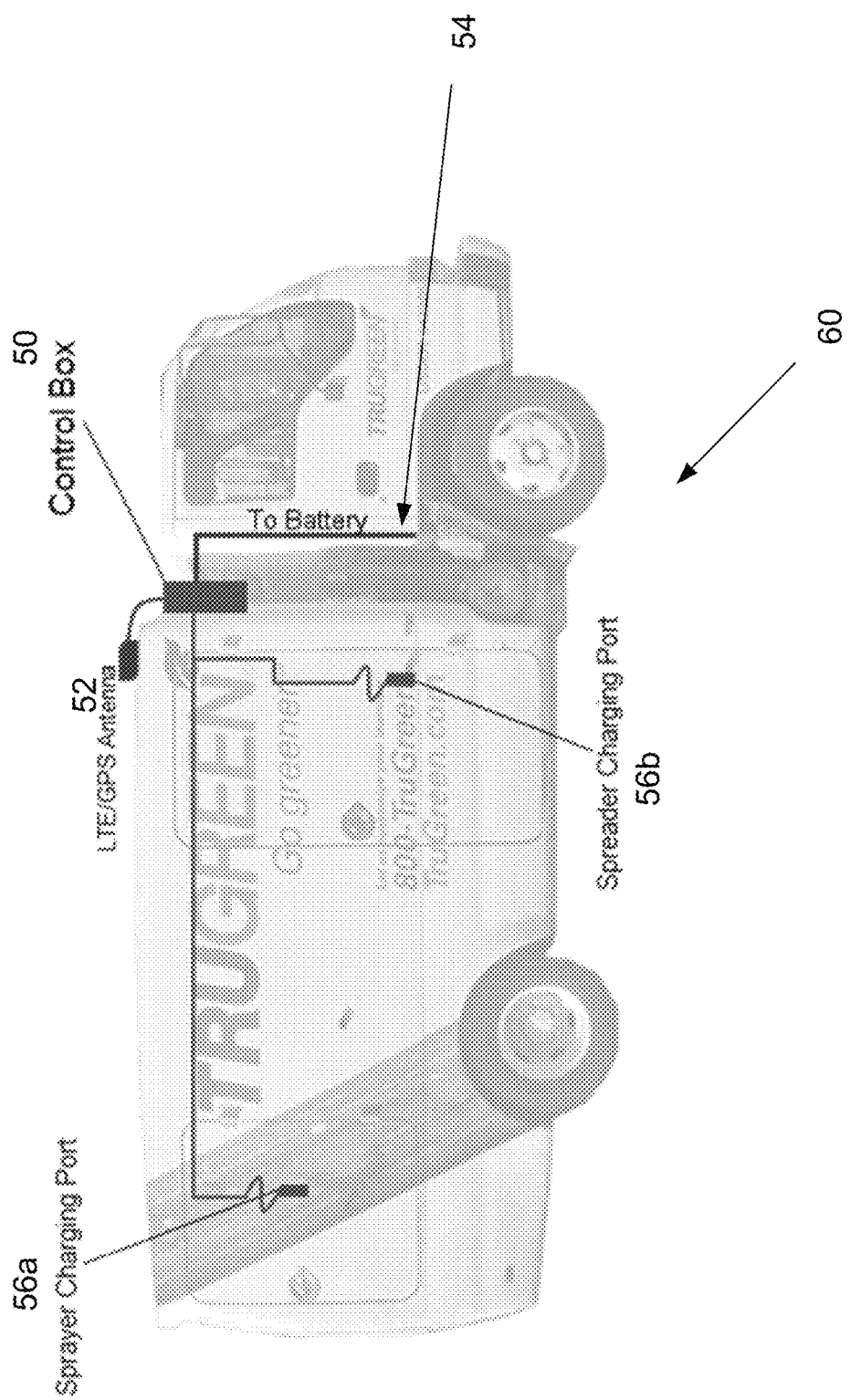
FIG. 4 shows a diagram of a vehicle or truck with components of the technician performance system installed therein.

FIG. 4 shows an example of a truck or similar vehicle 60 with components of the technician performance system installed therein. A control box 50 is the central controller and orchestrator of the system, and is in wireless communications with the various TPMs in use on the sprayers, spreaders, or other devices, and may also be in electronic communication with one or more remote system servers. An LTE/GPS antenna 52, mounted on the truck, typically on an outside upper surface such as the roof, is in electronic communication (typically directly wired) with the control box 50. In one embodiment, the antenna 52 is mounted using industrial double-side tape. The system may be powered by its own battery. Alternatively, it may be powered by another power source, such as the battery 54 of the truck. The control box 50 is electronically connected to one or more charging ports 56*a, b* for the TPMs, sprayers, spreaders, or other devices at various points inside the truck.

Figure 5:
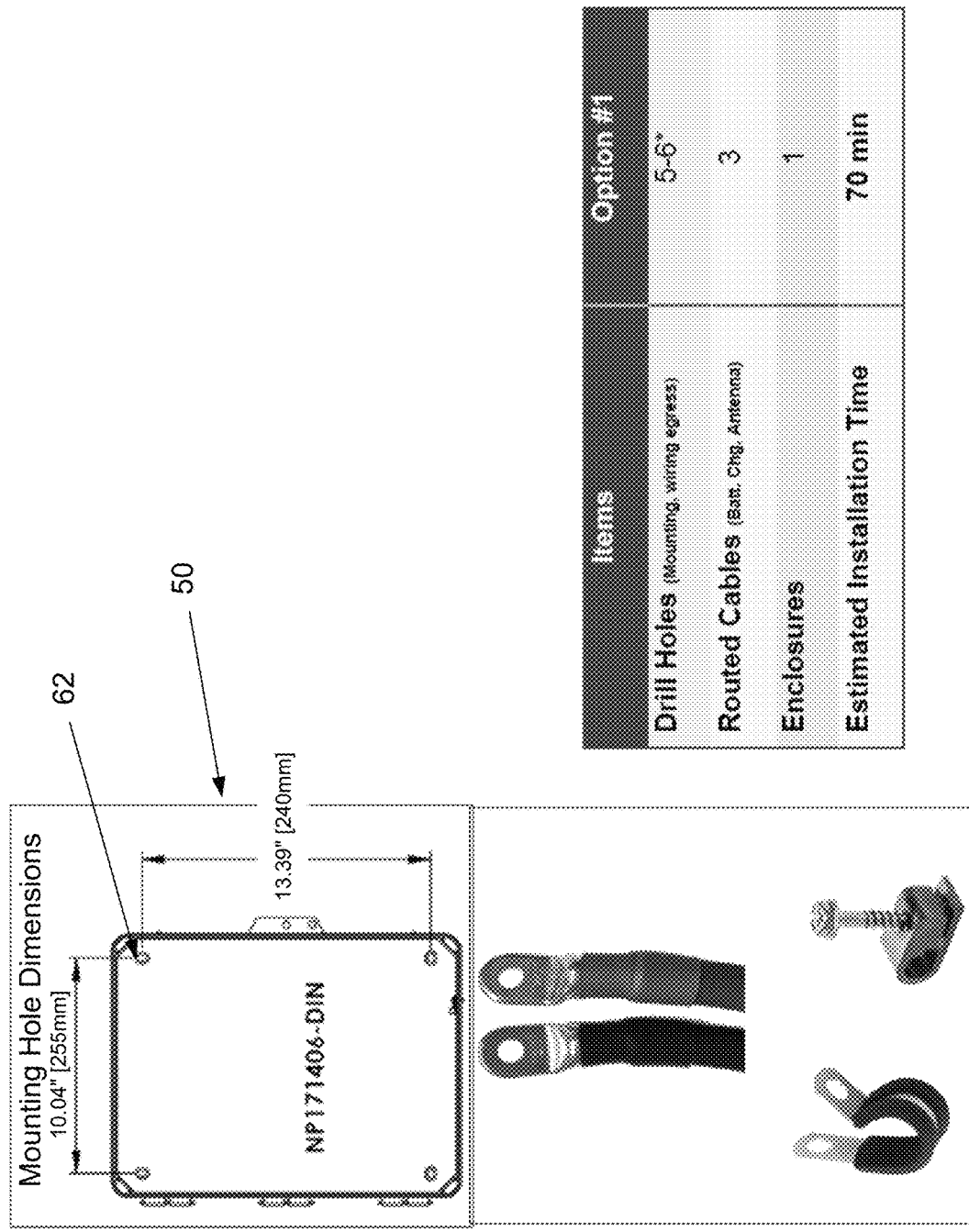
FIG. 5 shows an embodiment of a control box.

FIG. 5 shows an exemplary embodiment of the control box 50 with mountings. In the embodiments shown, four holes 62 in the back of the box are used to mount the control box, using carriage bolts sufficient short so as to not create safety issues with regard the mounting location (such as bolts protruding into a spreader cabinet). The box comprises a hinged lid 64, which allows access to the interior. A cable 66 is used to connect the control box to the LTE/GPS antenna 52. Positive and negative battery cables with associated lugs, with corresponding color code, are used to connect to the truck battery (or similar power source). Screw-mounted cable tie downs may be used to secure any of the cables in the system. The system as shown may be retrofitted to an existing truck in 70 minutes or less.

Figure 6:
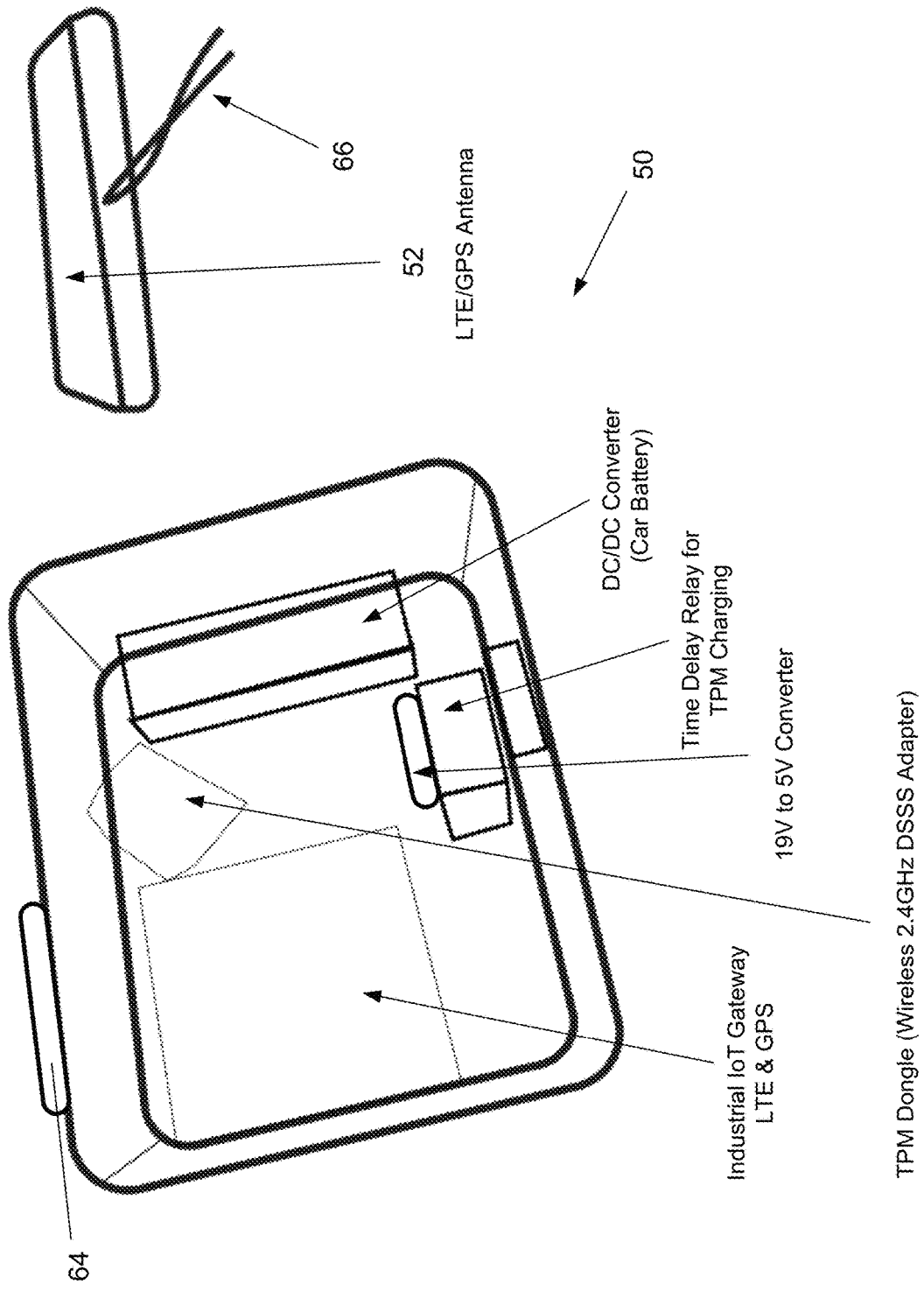
FIG. 6 shows a view of the inside of the control box, along with a view of a mounted LTE/GPS antenna.

FIG. 6 shows a view of the inside of the control box, along with a view of a mounted LTE/GPS antenna 52. Components include an industrial IoT Gateway (LTE & GPS), a DC/DC converter (connected to the car battery for power), a 19V to 5V convert, a TPM dongle, and a time delay relay for TPM charging.

Figure 7:
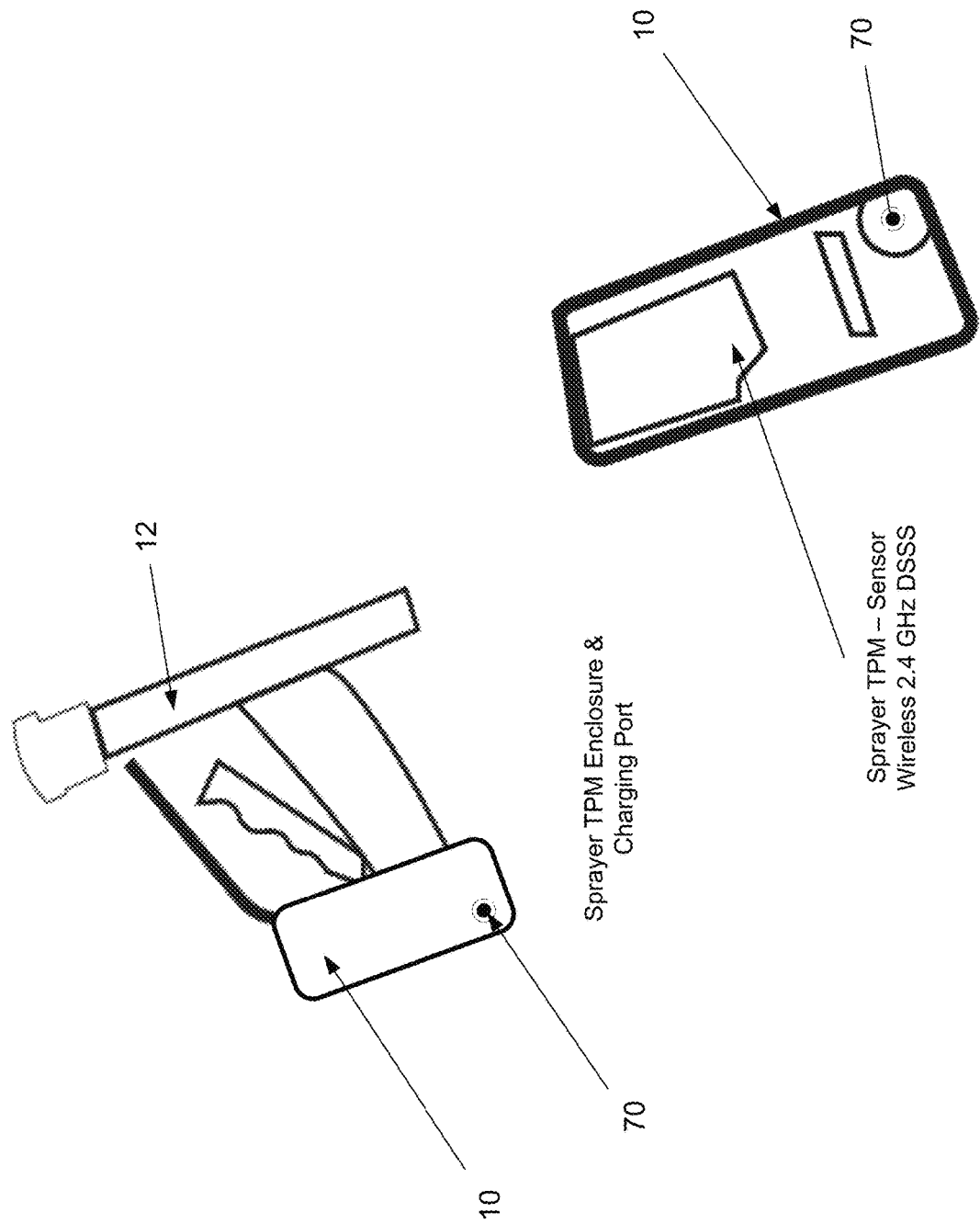
FIG. 7 shows a view of a sprayer TPM enclosure and charging power, as well as a view of the interior of the sprayer TPM.

FIG. 7 shows a view of a sprayer 12 TPM 10 and charging port 70, as well as a view of the interior of the sprayer TPM, including a control board and wireless communications chip.

Figure 8:
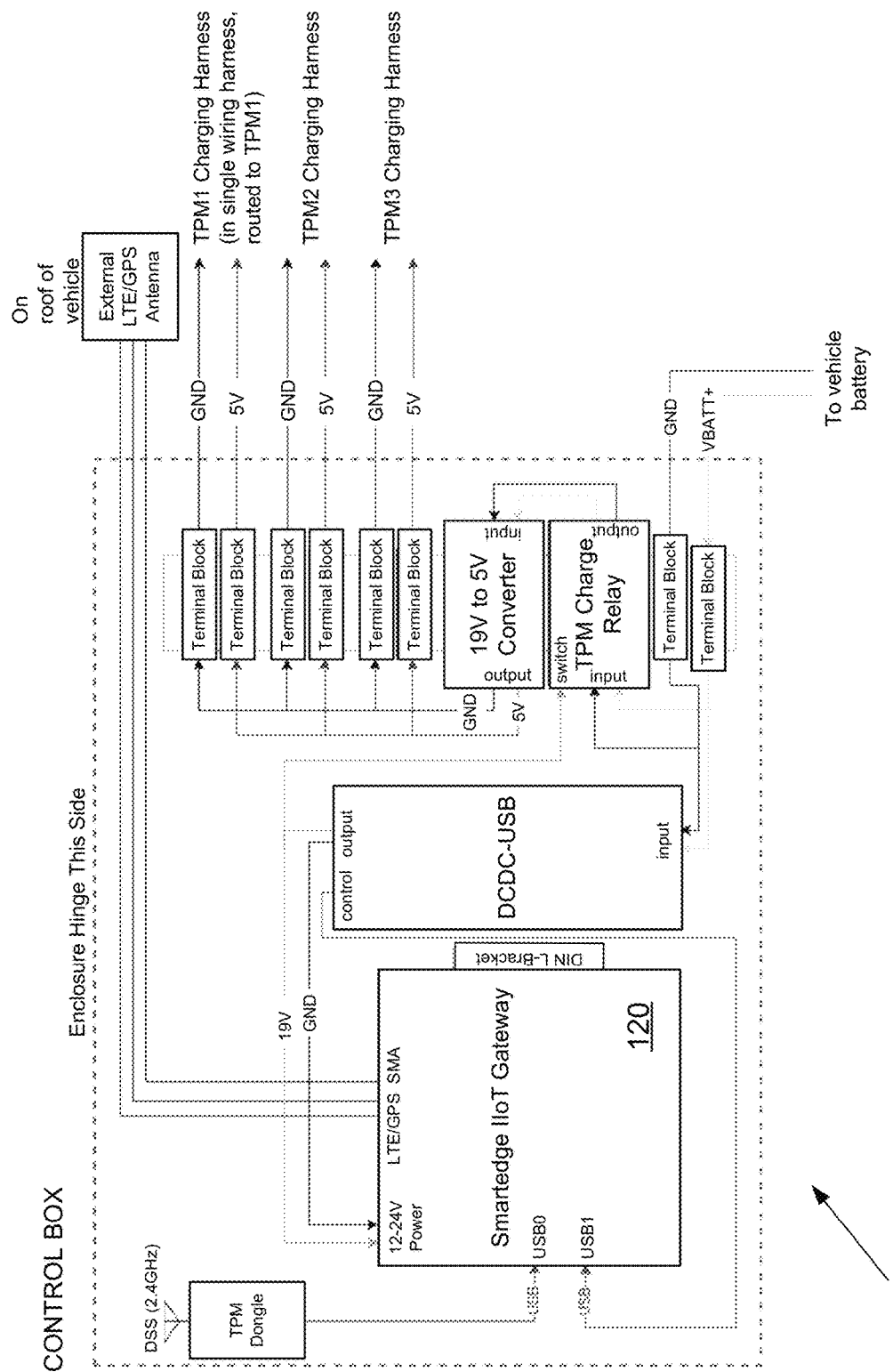
FIG. 8 shows a wiring diagram for the control box.
Figure 9:
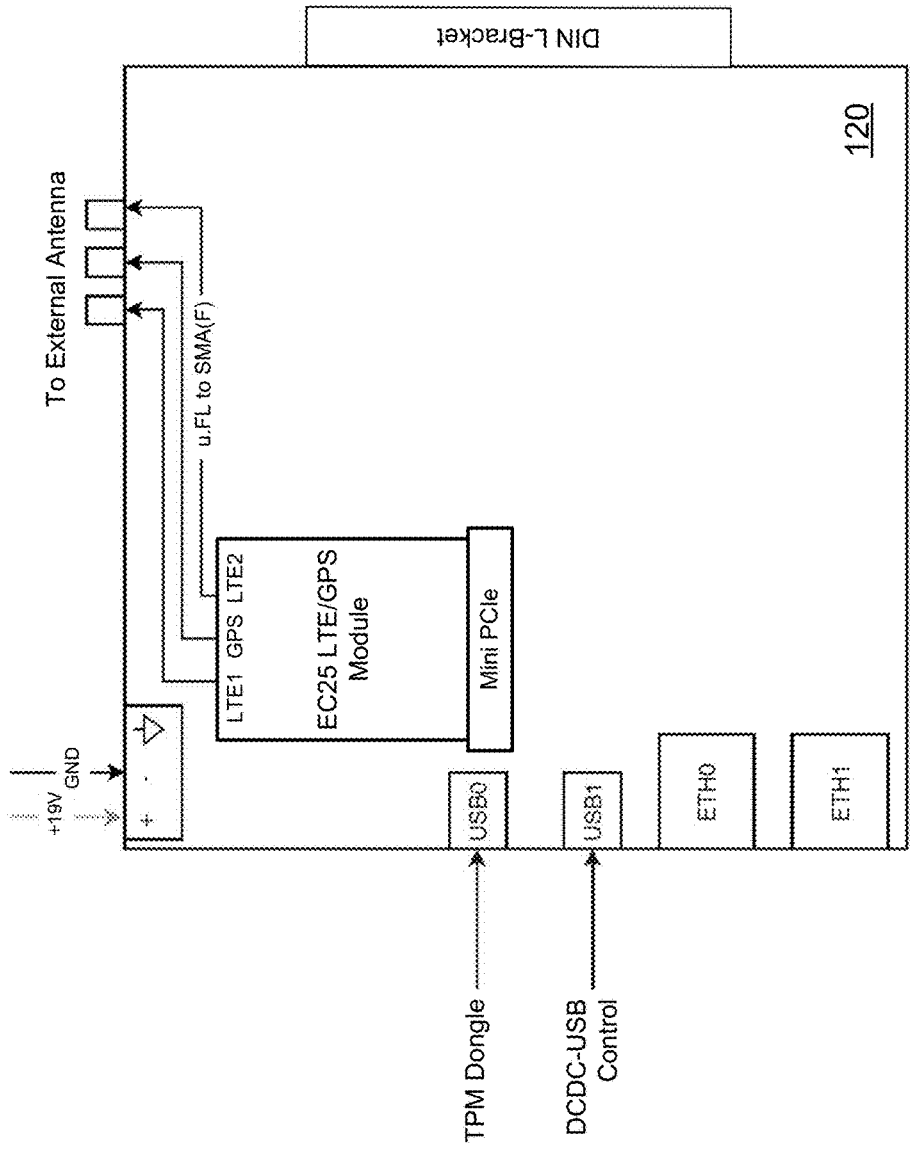
FIG. 9 shows a diagram of the gateway of FIG. 8.

FIG. 8 shows a wiring diagram 110 for the control box. FIG. 9 shows a diagram of the gateway 120 of FIG. 8, with USB ports (USB0 and USB1) for the TPM dongle and the DCDC-USB control, as well as ethernet ports (ETH0 and ETH1).

In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, mobile computing devices, microprocessor-based systems, multiprocessor systems, TV set-top boxes and devices, programmable consumer electronics, cell phones, personal digital assistants (PDAs), tablets, smart phones, mobile phones, modular phones, touch screen devices, smart TV, TVs, internet-enabled appliances, internet-enabled security systems, internet-enabled gaming systems, internet-enabled watches; internet-enabled cars (or transportation), network PCs, mini-computers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices (e.g., "cloud computing") linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system or computing system environment comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. A client device may comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CD-ROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infra-red, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C #, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, mobile computing devices, personal digital assistants, computer notebooks, hand-held devices, cellular phones, mobile phones, modular phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A lawn-care monitoring system, comprising:
a lawn spreader with a hopper and a handlebar assembly;
a technician performance module comprising a module housing containing a wireless transmitter and a plurality of sensors, said plurality of sensors comprising a GPS, at least one gyroscope, and at least one accelerometer;
wherein the technician performance module is removably affixed to the handlebar assembly;
wherein the technician performance module is configured to collect data from the plurality of sensors during operation of the lawn spreader by a technician at a first location to apply a product;
wherein the data collected comprises heading, orientation, and position of the technician performance module during the operation of the lawn spreader;
wherein the technician performance modules is configured to wireless transmit the data collected during the operation of the lawn spreader;
further comprising a microprocessor in electronic communication with a database, wherein the microprocessor is operable to:
determine the application path and size of the lawn spreader during operation of the lawn spreader by the technician at the first location;
calculate a performance indicator for the technician during operation of the lawn spreader at the first location based on the application path and size.

2. The system of claim 1, wherein the plurality of sensors further comprises a compass and pedometer.

3. The system of claim 1, wherein the plurality of sensors further comprises an inertial measurement unit.

4. The system of claim 1, wherein the technician performance module is configured to perform sensor fusion of the data from the plurality of sensors.

5. The system of claim 1, wherein the wireless transmission is periodic.

6. The system of claim 1, wherein the wireless transmission is to a control box.

7. The system of claim 6, wherein the control box is located in a vehicle.

8. The system of claim 6, wherein the control box comprises an industrial IoT gateway.

9. The system of claim 1, wherein the data is electronically transmitted to a remote server configured to store and analyze the data.

10. A lawn-care monitoring system, comprising:
a water hose sprayer with a handle;
a technician performance module comprising a module housing containing a wireless transmitter and a plurality of sensors, said plurality of sensors comprising a GPS, at least one gyroscope, and at least one accelerometer;
wherein the technician performance module is removably affixed to the water hose sprayer;
wherein the technician performance module is configured to collect data from the plurality of sensors during operation of the water hose sprayer by a technician at a first location to apply a product;
wherein the data collected comprises heading, orientation, and position of the technician performance module during the operation of the water hose sprayer;
wherein the data collected further comprises the trigger position of water hose sprayer during the operation of the water hose sprayer;
wherein the technician performance modules is configured to wireless transmit the data collected during the operation of the water hose sprayer;
further comprising a microprocessor in electronic communication with a database, wherein the microprocessor is operable to:

determine the motion path of the technician performance module and the spray pattern of the water hose sprayer during operation of the lawn spreader by the technician at the first location;

calculate a performance indicator for the technician during operation of the water hose sprayer at the first location based on the motion path of the technician performance module and the spray pattern of the water hose sprayer.

11. The system of claim 10, wherein the sprayer is configured to attach to a hose.

12. The system of claim 10, wherein the plurality of sensors further comprises a compass and pedometer.

13. The system of claim 10, wherein the plurality of sensors further comprises an inertial measurement unit.

14. The system of claim 10, wherein the technician performance module is configured to perform sensor fusion of the data from the plurality of sensors.

15. The system of claim 10, wherein the wireless transmission is to a control box located in a vehicle.

16. The system of claim 15, wherein the control box comprises an industrial IoT gateway.

17. The system of claim 10, wherein the data is electronically transmitted to a remote server configured to store and analyze the data.

* * * * *